(12) United States Patent
Peretti et al.

(10) Patent No.: US 9,379,654 B2
(45) Date of Patent: Jun. 28, 2016

(54) SELF-COMMISSIONING PROCEDURE FOR INDUCTANCE ESTIMATION IN AN ELECTRICAL MACHINE

(71) Applicant: ABB Technology AG, Zurich (CH)

(72) Inventors: Luca Peretti, Vasteras (SE); Dmitry Svechkarenko, Sundbyberg (SE)

(73) Assignee: ABB Technology AG, Zurich (CH)

( * ) Notice: Subject to any disclaimer, the term of this patent is extended or adjusted under 35 U.S.C. 154(b) by 140 days.

(21) Appl. No.: 14/169,768

(22) Filed: Jan. 31, 2014

(65) Prior Publication Data

US 2014/0145655 A1    May 29, 2014

Related U.S. Application Data

(63) Continuation of application No. PCT/EP2012/063594, filed on Jul. 11, 2012.

(30) Foreign Application Priority Data

Aug. 1, 2011    (EP) ..................................... 11176085

(51) Int. Cl.
  *H02P 21/14*    (2006.01)
  *H02P 21/00*    (2006.01)

(52) U.S. Cl.
  CPC ............ *H02P 21/0039* (2013.01); *H02P 21/14* (2013.01); *H02P 21/141* (2013.01); *H02P 2203/11* (2013.01)

(58) Field of Classification Search
  USPC .................. 318/400.02, 400.18, 400.22, 430; 322/22
  See application file for complete search history.

(56) References Cited

U.S. PATENT DOCUMENTS

| 5,886,498 A | 3/1999 | Sul et al. |
| 2005/0073280 A1* | 4/2005 | Yoshinaga ................ H02J 3/01 318/727 |

(Continued)

OTHER PUBLICATIONS

Inoue et al.; "Effectiveness of Voltage Error Compensation and Parameter Identification for Model-Based Sensorless Control of IPMSM"; IEEE Transactions on Industry Applications; vol. 45, No. 1; Jan./Feb. 2009; pp. 213-221.
European Search Report Application No. EP 11 17 6085 Completed: Mar. 22, 2012; Mailing date: Apr. 2, 2012 8 pages.
International Search Report and Written Opinion of the International Searching Authority Application No. PCT/EP2012/063594 Completed: Jul. 24, 2012; Mailing Date: Jul. 31, 2012 11 pages.

(Continued)

*Primary Examiner* — Paul Ip
*Assistant Examiner* — Said Bouziane
(74) *Attorney, Agent, or Firm* — Whitmyer IP Group LLC

(57) ABSTRACT

A method of estimating inductances and flux linkages of an electrical machine supplied with drive currents via current regulators. Drive current values are measured and fed back to the regulators for closed-loop control. The method includes providing one current regulator with an alternating current value either for a direct axis current reference $i^*_d$ or for a quadrature axis current reference $i^*_q$ of the machine current vector, while providing another current regulator with a predetermined direct current value for the remaining one of the two current references $i^*_d$ and $i^*_q$. After a predetermined time, a varying signal is superimposed onto an output signal generated by the current regulator in response to the AC value. Finally, a contribution signal, which corresponds to the contribution of the superimposed varying signal to the drive currents, is determined, and the machine inductances and flux linkages are estimated on the basis of the contribution signal.

16 Claims, 5 Drawing Sheets

(56) References Cited

U.S. PATENT DOCUMENTS

2008/0079378 A1* 4/2008 Nakatsugawa ...... H02P 21/0035
　　　　　　　　　　　　　　　　　　　　　　　318/430
2008/0129243 A1* 6/2008 Nashiki .................. H02K 1/145
　　　　　　　　　　　　　　　　　　　　　　　318/701
2008/0309265 A1* 12/2008 Terada .................... H02P 21/06
　　　　　　　　　　　　　　　　　　　　　　　318/400.02

OTHER PUBLICATIONS

Morimoto, et al.; "Position and Speed Sensorless Control System of Permanent Magnet Synchronous Motor with Parameter Identification"; Electrical Engineering in Japan, vol. 160, No. 2; (2007); pp. 68-76.

Zatocil; "Sensorless Control of AC Machines Using High-Frequency Excitation"; IEEE 2008; pp. 1024-1032.

* cited by examiner

SELF-COMMISSIONING PROCEDURE FOR INDUCTANCE ESTIMATION IN AN ELECTRICAL MACHINE

FIELD OF THE INVENTION

The present invention generally relates to a method and system of estimating inductances and flux linkages of an electrical machine.

BACKGROUND OF THE INVENTION

The interest in synchronous reluctance motors is increasing as it might become a candidate for replacing a conventional induction motor. In order to fully exploit the capabilities of the synchronous reluctance motor, a frequency converter is needed and a closed-loop control should be performed. However, closed-loop controls (especially speed-sensorless controls) have to be provided with appropriate parameters to avoid instabilities and to work properly. Usually, the parameters required by the control are obtained through a series of experimental tests.

Nowadays, these tests are performed automatically by the frequency converter with a minimal intervention by an external human operator. Different test signals on the machine and post-processing methods are exploited in order to estimate and complete the set of the parameters. These automatically performed tests are generally referred to as "self-commissioning" or "ID-run".

One of the major benefits of ID-runs is the possibility to conduct standstill tests, during which the machine is at complete standstill and different signals are injected. In this operating mode, maximum safety is obtained, and the motor can be tested on-site with direct connection to a mechanical load. This is particularly beneficial when the application is revamped and only the frequency converter is replaced, while leaving the existing motor. In this case, there is no need to remove the motor from the plant.

In the specific case of the synchronous reluctance motor, some issues arise. The machine has a strongly non-linear relation between current and flux linkages, with saturation effects and cross-magnetization effects more pronounced.

An example is shown in FIG. 1, which illustrates the current-to-flux linkage curves for a synchronous reluctance motor obtained from the finite element method analysis.

In FIG. 1, $\lambda_d$ and $\lambda_q$ are the flux linkages in the d and q axes, respectively, and $i_d$ and $i_q$ are the corresponding currents, i.e. a direct axis current component and a quadrature axis current component, respectively, of a motor current vector. The derivatives of $\lambda_d$ and $\lambda_q$ with respect to $i_d$ and $i_q$, respectively, return the value of the inductances $L_d$ and $L_q$. Inductances $L_d$ and $L_q$ on d and q axes, respectively, are dependent on both currents $i_d$ and $i_q$. In practice, $L_d$ will to the greatest part depend on $i_d$ but also to a smaller extent on $i_q$. This is referred to as a cross-coupling cross-magnetization effect.

For a correct closed-loop (speed-sensorless) control of the machine, knowledge of the inductances in any operating point is beneficial. The inductance is generally defined as the ratio of the flux linkage over the current; depending on the adopted control strategy, apparent inductances (ratio between large-signal values) or differential inductances (ratio between small-signal values) might be needed. In any case, it is clear from FIG. 1 that the inductances vary as a function of the operating point.

The left-hand side of FIG. 1 shows the flux linkage on the d axis, while the right hand side of FIG. 1 shows the flux linkage on the q axis. Saturation is more visible on the d axis due to the presence of more iron material in the magnetic path, while the q axis has a more "linear" profile due to more air material in the magnetic path.

From FIG. 1, it can be deducted that a truly effective ID-run should be capable of estimating the inductances in any operating point. The drawback is that for each operating point where both currents $i_d$ and $i_q$ are different from zero, an electromagnetic torque is produced and the motor starts rotating (if the mechanical load allows it), according to the torque and mechanical equations:

$$\tau = \frac{3}{2} p(\lambda_d i_q - \lambda_q i_d)$$

$$\tau = \tau_L + J_m \frac{d\omega_m}{dt} + B_m \omega_m$$

where p is the number of pole pairs in the machine, $\tau$ is the torque, $\tau_L$ is the load torque, $J_m$ is the mechanical inertia, $B_m$ is the viscous friction and $\omega_m$ is the mechanical speed.

Current self-commissioning procedures are capable of estimating, at standstill, the inductances where either $i_d$ or $i_q$ is zero, thus when no torque is produced. For all other operating points, torque ramps are induced in the motor, and the inductances are estimated during the speed transient. Such operating condition is not at standstill, and might require the motor to be disconnected from the mechanical load.

SUMMARY OF THE INVENTION

A general object of the present invention is to solve or at least mitigate the above-described problems in the art.

This object is attained in a first aspect of the present invention by a method for estimating an inductance and/or flux linkage of an electrical machine, which electrical machine is supplied with drive currents via a first current regulator and a second current regulator, and actual values of drive currents are measured and fed back to the two current regulators such that closed-loop control is provided. The method comprises the steps of providing the first current regulator with an alternating current (AC) value either for a direct axis current reference i*$_d$ or for a quadrature axis current reference i*$_q$ of a machine current vector, while providing the second current regulator with a predetermined direct current (DC) value for the remaining one of the two current references i*$_d$ and i*$_q$. Subsequently, after a predetermined time period has expired, a varying signal is superimposed in a control path where the AC value is provided. Finally, a contribution signal which corresponds to the contribution of the superimposed varying signal to the drive currents, is determined, and the inductance and/or the flux linkage is estimated on the basis of the contribution signal.

This object is further attained in a second aspect of the present invention by a system for estimating an inductance and/or flux linkage of an electrical machine, which system comprises a first current regulator and a second current regulator via which the electrical machine is supplied with drive currents. Said two current regulators are arranged to receive measured values of the drive currents such that closed-loop control is provided. The first current regulator is further arranged to be supplied with an AC value either for a direct axis current reference i*$_d$ or for a quadrature axis current reference i*$_q$ of a machine current vector, while the second current regulator is arranged to be provided with a predetermined DC value for the remaining one of the two current references i*$_d$ and i*$_q$. The system further comprises a signal-injecting device arranged to superimpose, after a predetermined time period has expired, a varying signal in a control path where the AC value is provided, and a calculating device arranged to determine a contribution signal which corresponds to the contribution of the superimposed varying signal to the drive currents. The calculating device is further arranged to estimate the inductance and/or the flux linkage on the basis of the contribution signal.

Thus, the present invention advantageously provides a self-commissioning procedure for frequency converters connected to electrical machines for estimation of the inductances and flux linkages in the electrical machine with saturation and cross-magnetization effects taken into account. With the present invention, the electrical machine is operating in standstill or quasi-standstill condition while the inductance and the flux linkage are estimated.

When either of the current regulators is provided with an AC signal, and the remaining one is provided with a predetermined DC signal, the motor produces an oscillating torque. The frequency of the AC signal is preferably high enough to prevent rotation of the motor (i.e. a standstill condition prevails), or at least the rotation is controlled such that the motor is close to being at standstill (i.e. a quasi-standstill condition prevails). At the same time, the frequency should be sufficiently low to allow the current regulators to follow the AC signal(s) provided to the regulators.

The AC signal has a different frequency from the signal superimposed after the current regulator. The superimposed signal is typically a sinusoidal signal of a higher frequency than the AC signal. The lower frequency is meant to create an alternating torque fast enough to prevent the motor from rotating, or retain the motor oscillations in the quasi-standstill condition. The second frequency is used for small-signal perturbation and for estimation of the inductances.

In an embodiment of the present invention, a Goertzel algorithm is used, implying that the frequencies of the AC signal and the superimposed signal should have no common divisor in order to avoid detection of spurious harmonics of the AC signal in the signal of interest.

In an embodiment of the method of the present invention, the steps of the method are performed with a plurality of different amplitude values of the AC value. Advantageously, a number of operation points are thereby obtained.

In a further embodiment of the method of the present invention, the steps of the method are performed with a plurality of different predetermined DC values. Advantageously, a number of operation points are thereby obtained.

In still another embodiment of the present invention, the steps of said method are performed with an AC value provided for both the direct axis current reference $i^*_d$ and the quadrature axis current reference $i^*_q$. In order to be able to subsequently control the motor with respect to cross-coupling, saturation and cross-magnetization effects, it is beneficial to have as much information at hand as possible regarding the above described parameters. It may thus be advantageous to have access to a great number of motor operating points with respect to both the direct axis current component $i_d$ and the quadrature axis current component $i_q$. Operation of the motor, performed automatically by a control program, will be more efficient and exact with knowledge of different operating points and in particular with different operating points for both current vector components.

Further, it is to be understood that one of the current references could be set to zero while the other reference is varied over a range of values, and vice versa. This is particularly useful in case the current regulator is a PI regulator, which needs to be tuned with respect to proportional and integral gain.

In yet a further embodiment of the present invention, hysteresis regulators are used instead of PI regulators. In the case of using hysteresis regulators as current regulators, the signal superimposed in a control path where the AC value is applied, is typically an AC.

In still a further embodiment of the present invention, a speed regulator is provided with a motor speed reference, wherein actual values of the motor speed are measured and fed back to the speed regulator such that closed-loop control is provided. Finally, the first current regulator is provided with the output of the speed regulator as an AC value.

Additional embodiments of the present invention, as well as further features and advantages, will be disclosed in the following.

BRIEF DESCRIPTION OF THE DRAWINGS

Embodiments of the present invention and advantages thereof will now be described by way of non-limiting examples, with reference to the accompanying drawings in which.

DETAILED DESCRIPTION OF THE INVENTION

Figure 1:
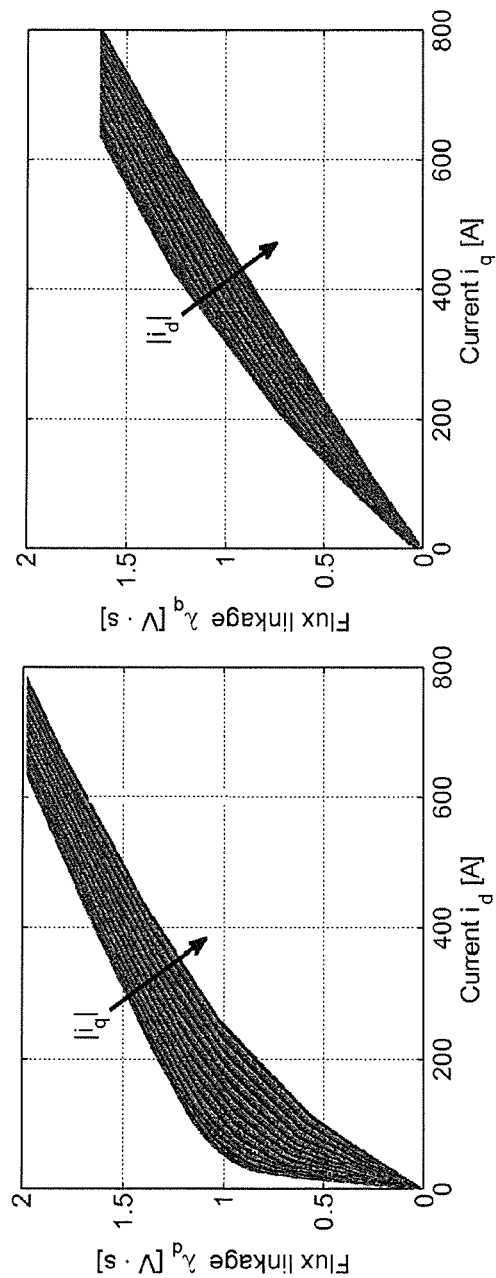
FIG. 1 shows flux linkages as a function of direct axis and quadrature axis currents, in the left-hand side graph the flux linkage on the d axis is shown and in the right-hand side graph the flux linkage on the q axis is shown.
Figure 2:
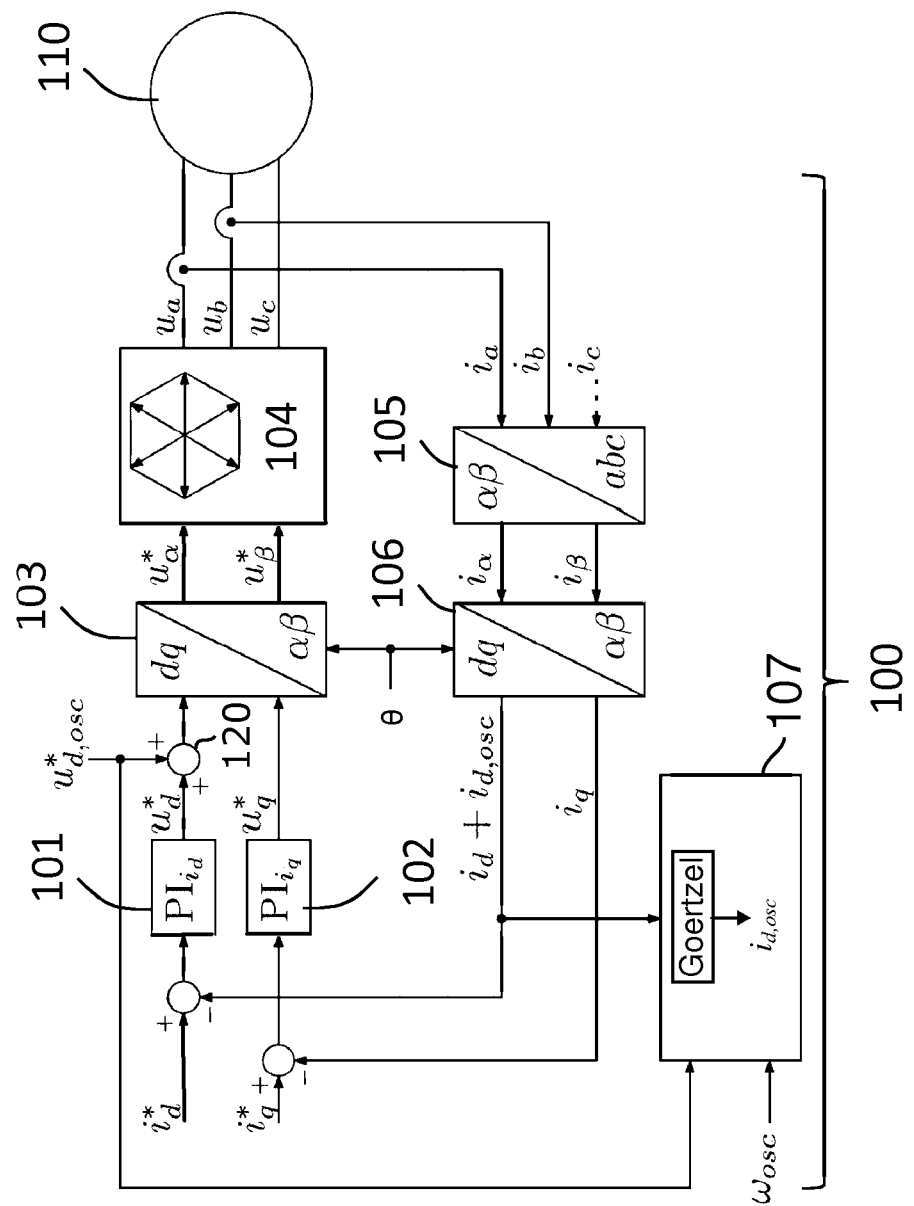
FIG. 2 shows a system for estimating inductances and flux linkages of an electrical machine according to an embodiment of the present invention.

FIG. 2 shows a control system 100 according to an embodiment of the present invention for controlling an electrical machine 110 such as a synchronous reluctance motor.

In this embodiment, a direct axis current reference $i^*_d$ of a motor current vector is provided to a PI regulator 101, while a quadrature axis current reference $i^*_q$ of the motor current vector is provided to a PI regulator 102. The direct axis current component path of the control system 100 is responsible for controlling the flux linkage in the machine, while the quadrature axis component path is responsible for controlling the machine torque.

In case tuning of the PI regulators is necessary, the tuning may be performed by providing the PI regulator 101 with different predetermined DC values for the direct axis current reference $i^*_d$ while providing the PI regulator 102 with a zero value for the quadrature axis current reference $i^*_q$. Hence, no torque is produced. The PI regulator 101 may then be tuned through analysis of transient response of the direct axis current component. This procedure is subsequently repeated by providing the PI regulator 102 with different predetermined DC values for the quadrature axis current reference $i^*_q$ while providing the PI regulator 101 with a zero value for the direct axis current reference $i^*_d$ for tuning the PI regulator 102.

Further, before procuring motor operating points with both $i^*_d \neq 0$ and $i^*_q \neq 0$, it may be desired to estimate inductances and flux linkages with one of the two current references at zero level while altering the level of the other current reference, and vice versa. Thus, different predetermined DC values for the direct axis current reference $i^*_d$ are provided to the PI regulator 101, while the PI regulator 102 is provided with a zero value for the quadrature axis current reference $i^*_q$. After the PI regulators, a small sinusoidal voltage signal $u^*_{d,osc}$ is superimposed by a signal-injecting unit 120 onto to the voltage $u^*_d$ generated by the PI regulator 101. That is, the sinusoidal voltage signal is superimposed in a control path where the predetermined DC value is provided. A contribution signal $i_{d,osc}$, which corresponds to the contribution of the superimposed sinusoidal voltage signal to the drive currents, is determined from measured drive current signals at a calculation block 107 after appropriate transformations have been undertaken. In particular, the contribution signal is determined by using a so-called Goertzel algorithm, which effectively is a single-tone version of the discrete Fourier transform. Thereafter, differential inductance can be determined at the calculation block 107 by performing $|u^*_{d,osc}|/(\omega_{osc} |i_{d,osc}|)$, where $\omega_{osc}$ is the angular frequency of the superimposed voltage. Curve $\lambda_d=f(i_d, i_q)$ for $i_q=0$ may then be elaborated for different operating points. That is, due to the closed loop control which is utilized, the actual direct axis current component $i_d$ will ideally follow the predetermined DC value provided to the PI regulator 101. Respectively, the actual quadrature axis current component $i_q$ in this particular measurement will ideally follow the zero value provided to the PI regulator 102. The small voltage signal $u^*_{d,osc}$ with frequency $\omega_{osc}$ superimposed at the output of the PI regulator 101 will lead to generation of a small current signal $i_{d,osc}$ with frequency $\omega_{osc}$ on top of the direct axis current component $i_d$. Typically, the frequency $\omega_{osc}$ of the superimposed signal is selected such that the PI regulators will not cancel that small-scale sinusoidal signal.

Thereafter, the procedure is repeated by providing the PI regulator 101 with a zero value for the direct axis current reference $i^*_d$, which facilitates derivation of $\lambda_q=f(i_d, i_q)$ for $i_d=0$ for different operating points.

Before proceeding to describe estimation of inductances in other operating points, the remaining functional blocks of the control system 100 of FIG. 2 will be described. Most of the functional blocks deal with various types of vector transformations. These transformations are performed since they greatly simplify complexity of the mathematical model of the system. Firstly, block 103 performs an inverse Park transformation, which is a transformation from a rotating (d, q, θ) to a stationary (α, β) reference frame, where θ is the rotor angle.

The inverse Park transformation block 103 is followed by a space vector modulation (SVM) block 104. The space vector modulation (SVM) can directly transform the stator voltage vectors from the two-phase α,β-coordinate system into pulse-width modulation (PWM) signals. SVM generally involves inverse Clarke transformation.

Thereafter, the motor 110 is supplied with a set of PWM drive signals. Tracing back through the control path to the PI regulators, it can be seen that this set of drive signals is derived, via the transformations described in the above, from the sum signal $u^*_d+u^*_{d,osc}$ and the regulated quadrature axis voltage component from the PI regulator 102, i.e. $u^*_q$.

The three motor currents are measured and fed back to the PI regulators via Clarke transformation block 105 and Park transformation block 106. In practice, the instantaneous sum of the three current values is zero. Thus, with knowledge of two of the currents, the third can be determined. As is indicated in FIG. 2, current $i_c$ is optional but in practice typically omitted, since the cost of a third current sensor can be avoided. The Clarke transform transforms a three axis ($i_a$, $i_b$, $i_c$), two dimensional coordinate system referenced to the motor stator onto a two axis ($i_\alpha$, $i_\beta$) system while maintaining the same reference.

This is followed by a Park transformation block 106, which transforms the stationary reference frame (α, β) into the rotating reference frame (d, q, θ).

Finally, the actual values $i_d$, $i_q$ of the motor current vector are fed back to the respective PI regulators 101, 102, whereby closed-loop control is accomplished.

When estimating inductances and flux linkages at various operating points where both $i_d \neq 0$ and $i_q \neq 0$, the following procedure may be undertaken in accordance with an embodiment of the present invention. First, an alternating square-wave current value for the direct axis current reference $i^*_d$ is provided to the PI regulator 101, while a predetermined DC value for the quadrature axis current reference $i^*_q$ is provided to the PI regulator 102. An "alternating current (AC) value" refers to a current signal constantly changing sign in contrast to a "predetermined direct current (DC) value" which refers to a current signal which does not change sign and is preferably constant. After the PI regulators, a small sinusoidal voltage signal $u^*_{d,osc}$ is superimposed onto the voltage $u^*_d$ generated by the PI regulator 101 after a predetermined time period has expired.

Figure 3:
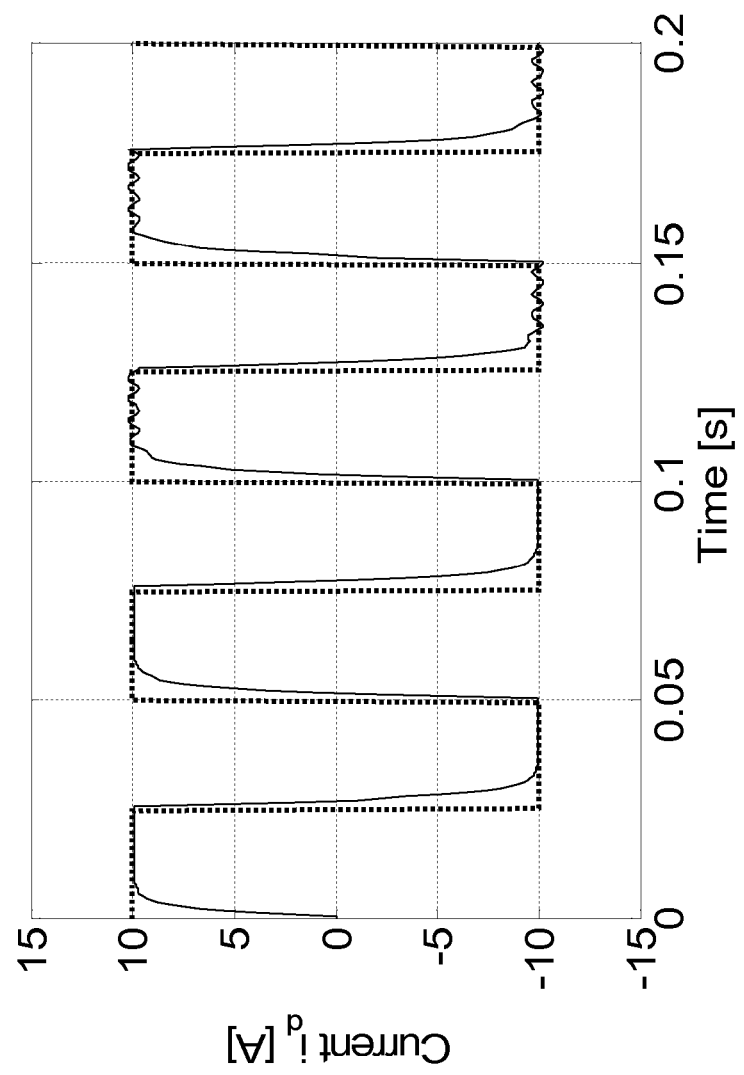
FIG. 3 illustrates a signal supplied to the electrical machine according to an embodiment of the present invention.

With reference to FIG. 3, this time period is in an embodiment 0.1 s, but the selection of time period depends on the specific situation to which the present invention is applied. As can be seen in FIG. 3 which illustrates the actual drive current of the motor (in this case the direct axis current component $i_d$ of the motor current vector), the current is a "clean" square-wave for 0.1 s, tracing the direct axis current reference $i^*_d$ provided to direct axis path of the control system. After 0.1 s has expired, the contribution signal $i_{d,osc}$ can be seen in the form of a small-scale sinusoidal signal superimposed onto the square-wave current component $i_d$.

The contribution signal $i_{d,osc}$ is determined from the measured drive current signals at a calculation block 107 after appropriate transformations have been undertaken. Again, the contribution signal is determined using the Goertzel algorithm. Thereafter, differential inductance can be determined at the calculation block 107 by performing $|u^*_{d,osc}|/(\omega_{osc} |i_{d,osc}|)$ where $\omega_{osc}$ is the angular frequency of the superimposed voltage. Again, due to the closed-loop control which is utilized, the actual direct axis current component $i_d$ will ideally follow the AC value provided to the PI regulator 101, which AC value has been set to be a square-wave. The actual quadrature axis current component $i_q$ will ideally assume the predetermined DC value provided to the PI regulator 102.

Advantageously, the procedure is repeated with different amplitudes of the square-wave, such that a great number of motor operating points are attained. The curve $\lambda_d=f(i_d, i_q)$ may then be elaborated with $i_q$ corresponding to the predetermined DC value provided to the PI regulator 102. Even further advantageous is to repeat the procedure with a number of different predetermined DC values. The curve $\lambda_d=f(i_d, i_q)$ may then be elaborated for a number of different operating points.

Thereafter, the procedure is repeated by providing the PI regulator 101 with a predetermined DC value for the direct axis current reference $i^*_d$, and by providing the PI regulator 102 with an alternating square-wave current value for the quadrature axis current reference $i^*_q$. Again, the procedure is advantageously repeated with a number of different square-wave amplitudes and a number of different predetermined DC values.

Figure 4:
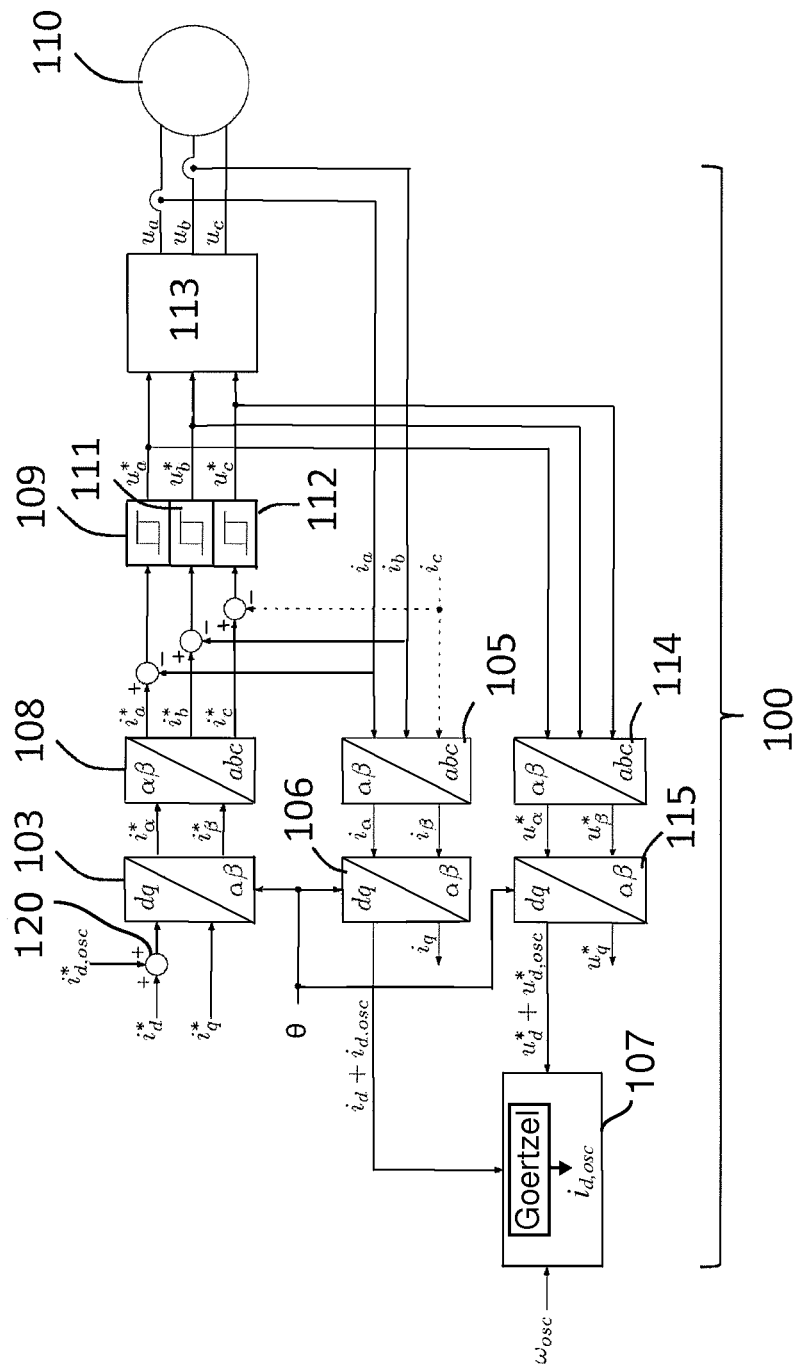
FIG. 4 shows a system for estimating inductances and flux linkages of an electrical machine according to a further embodiment of the present invention.

FIG. 4 shows a further embodiment of the present invention, where the control system 100 employs hysteresis regulators 109, 111, 112 instead of the PI regulators used in the system illustrated with reference to FIG. 2. If an input signal to the hysteresis regulator is below a first threshold A, the output is zero, while if an input signal exceeds a second threshold B (B>A), the output is 1. It should be noted that other outputs than 0 and 1 are possible in more elaborate hysteresis regulators. One of the differences of hysteresis regulators as compared to PI regulators is that response time of hysteresis regulators generally is considerably shorter.

In the case of using hysteresis regulators, there is no need to go through the tuning procedure utilized for the PI regulators, which was described in connection to FIG. 2.

Again, an alternating square-wave current value for the direct axis current reference $i^*_d$ is provided, in this case to block 103 which performs an inverse Park transformation. A predetermined DC value for the quadrature axis current reference $i^*_q$ is likewise provided to block 103. As in the case of the embodiment described with reference to FIG. 2, a varying signal $i^*_{d,osc}$ is superimposed by a signal-injecting unit 120 to the control path where the AC value is provided, after a predetermined time period has expired. In this particular embodiment, the varying signal is provided to an input of the inverse Park transformation block 103. Thereafter, the currents are supplied to the hysteresis regulators 109, 111, 112 via inverse Clarke transformation block 108. Before the motor 110 is supplied with a set of drive signals, a voltage inversion is performed at block 113.

The three motor currents are measured and supplied to Clarke transformation block 105 and Park transformation block 106. In practice, the instantaneous sum of the three current values is zero. Thus, with knowledge of two of the currents, the third can be determined. As is indicated in FIG. 4, current $i_c$ is optional but in practice typically omitted, since the cost of a third current sensor can be avoided. The Clarke transform transforms a three axis ($i_a$, $i_b$, $i_c$), two dimensional coordinate system referenced to the motor stator onto a two axis ($i_\alpha$, $i_\beta$) system while maintaining the same reference.

This is followed by a Park transformation block 106, which transforms the stationary reference frame ($\alpha$, $\beta$) into the rotating reference frame (d, q, $\theta$).

In this particular embodiment where hysteresis regulators 109, 111, 112 are utilized, the actual values $i_a$, $i_b$ of the motor current are fed back to the respective hysteresis regulator, whereby closed-loop control is accomplished.

The contribution signal $i_{d,osc}$ is determined from the measured drive current signals at a calculation block 107. Again, the contribution signal is determined using the Goertzel algorithm. Thereafter, differential inductance can be determined at the calculation block 107 by performing $|u^*_{d,osc}|/(\omega_{osc} |i_{d,osc}|)$ where $\omega_{osc}$ is the angular frequency of the superimposed voltage. In order to attain the voltage $u^*_{d,osc}$ required to determine the differential inductance, voltages $u^*_a$, $u^*_b$, $u^*_c$ output from the hysteresis regulators are measured and supplied to the calculation block 107 via Clarke transformation block 114 and Park transformation block 115. The Goertzel algorithm is again applied to the resulting voltage signal in order to attain the voltage $u^*_{d,osc}$.

Advantageously, the procedure is repeated with different amplitudes of the square-wave, such that a great number of motor operating points are attained. The curve $\lambda_d=f(i_d, i_q)$ may then be elaborated with $i_q$ corresponding to the predetermined DC value provided to the Park transformation block 103 for the quadrature axis current reference $i^*_q$. Even further advantageous is to repeat the procedure with a number of different predetermined DC values. The curve $\lambda_d=f(i_d, i_q)$ may then be elaborated for a number of different operating points. Thereafter, the procedure is repeated by providing the Park transformation block 103 with a predetermined DC value for the direct axis current reference $i^*_d$, and by providing the same Park transformation block 103 with an alternating square-wave current value for the quadrature axis current reference $i^*_q$. Again, the procedure is advantageously repeated with a number of different square-wave amplitudes and a number of different predetermined DC values.

Figure 5:
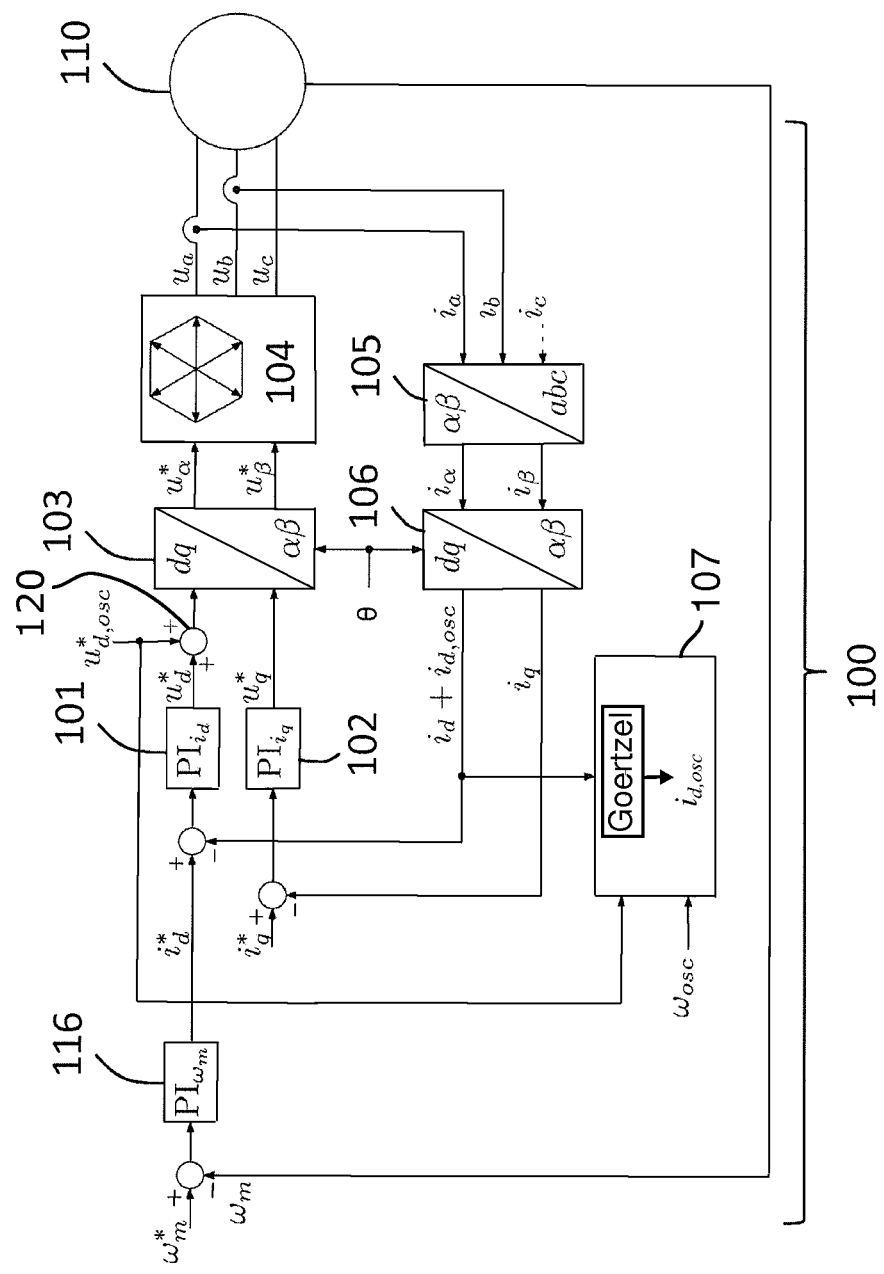
FIG. 5 shows a system for estimating inductances and flux linkages of an electrical machine according to yet a further embodiment of the present invention.

FIG. 5 illustrates a further embodiment of the present invention, which shows a system 100 identical to that of FIG. 2 with the exception of a further PI regulator 116 used for controlling speed of the motor 110. A motor speed reference $\omega^*_m$ is provided to the PI regulator 116, while the actual speed $\omega_m$ of the motor is measured and fed back to the PI regulator 116. The output of the PI regulator 116 serves as an AC value for any one of the current references, in this particular exemplifying embodiment to direct axis current reference $i^*_d$. Thus, the PI regulator 116 can be used to modify the AC value that follows a square-wave pattern. If the PI regulator 116 is configured to be dynamically slow, it can provide a slowly varying AC value that can maintain the mean value of the motor speed at zero, or close to zero. The PI regulator 116 can further be implemented in the system utilizing hysteresis controllers according to FIG. 4.

It is to be understood that the method of the present invention typically is performed by means of a device comprising a processing unit arranged to perform the steps of the invention when appropriate program code is downloaded to the processing unit. The processing unit may be embodied in the form of a general or special purpose computer, an ASIC, an FPGA, etc. Further, the functionality of the system of the present invention may be implemented by means of one or more such processing units.

The skilled person in the art realizes that the present invention by no means is limited to the examples described hereinabove. On the contrary, many modifications and variations are possible within the scope of the appended claims.

What is claimed is:

1. A method for estimating an inductance and/or flux linkage of an electrical machine, wherein the electrical machine is supplied with drive currents via a first current regulator and a second current regulator, and actual values of drive currents are measured and fed back to the two current regulators such that closed-loop control is provided, which method comprises the steps of:

providing the first current regulator with an AC value either for a direct axis current reference $i^*_d$ or for a quadrature axis current reference $i^*_q$ of a machine current vector, while providing the second current regulator with a predetermined DC value for the remaining one of the two current references $i^*_d$ and $i^*_q$;

superimposing via a signal-injecting device connected to the electrical machine, after a predetermined time period has expired, a varying signal in a control path where the AC value is provided; and determining, via a calculating device, a contribution signal which corresponds to the contribution of the superimposed varying signal to the drive currents, estimating, via the calculating device, the inductance and/or the flux linkage on the basis of the contribution signal.

2. The method of claim 1, wherein the steps of said method are performed with a plurality of different amplitude values of the AC value.

3. The method of claim 1, wherein the steps of said method are performed with a plurality of different predetermined DC values.

4. The method of claim 1, wherein the steps of said method are performed with an AC value provided for both the direct axis current reference and the quadrature axis current reference.

5. The method of claim 1, wherein the AC value provided to the first current regulator is a square-wave current.

6. The method of claim 1, wherein the two current regulators are PI regulators and the superimposed varying signal is an alternating voltage superimposed on an output signal generated by the first current regulator in response to the AC value.

7. The method of claim 1, wherein the current regulators are hysteresis regulators and the superimposed varying signal is an alternating current.

8. The method of claim 1, further comprising the steps of:
providing a speed regulator with a motor speed reference $\omega^*_m$;
measuring actual values of the motor speed $\omega_m$, and feeding back the measured actual speed values to the speed regulator such that closed-loop control is provided; and
supplying the first current regulator with the output of the speed regulator as an AC value.

9. The method of claim 1, wherein the electrical machine is a synchronous reluctance motor.

10. The method of claim 1, wherein the contribution signal is determined using the Goertzel algorithm.

11. A system for estimating an inductance and/or flux linkage of an electrical machine, which system comprises:
a first current regulator and a second current regulator via which the electrical machine is supplied with drive currents, said two current regulators being arranged to receive measured values of the drive currents such that closed-loop control is provided, wherein the first current regulator is further arranged to be supplied with an AC value either for a direct axis current reference $i^*_d$ or for a quadrature axis current reference $i^*_q$ of a machine current vector, while the second current regulator is arranged to be provided with a predetermined DC value for the remaining one of the two current references $i^*_d$ and $i^*_q$;
a signal-injecting device arranged to superimpose, after a predetermined time period has expired, a varying signal in a control path where the AC value is provided; and
a calculating device arranged to determine a contribution signal which corresponds to the contribution of the superimposed varying signal to the drive currents, and further arranged to estimate the inductance and/or the flux linkage on the basis of the contribution signal.

12. The system of claim 11, wherein a square-wave AC value is provided to the first current regulator.

13. The system of claim 11, wherein the two current regulators are PI regulators and the superimposed varying signal is an alternating voltage superimposed on an output signal generated by the first current regulator in response to the AC value.

14. The system of claim 11, wherein the current regulators are hysteresis regulators and the superimposed varying signal is an alternating current.

15. The system of claim 11, further comprising:
a speed regulator arranged to be provided with a motor speed reference $\omega^*_m$ and further being arranged to be supplied with actual values of the motor speed $\omega_m$ such that closed-loop control is provided, the first current regulator being arranged to be supplied with the output of the speed regulator as an AC value.

16. The method of claim 1, wherein the superimposed varying signal has a different frequency from the AC value provided to the first current regulator.

\* \* \* \* \*